A. J. BAZELEY.
CAR COUPLING.
APPLICATION FILED DEC. 26, 1908.

947,748.

Patented Jan. 25, 1910.
4 SHEETS—SHEET 1.

WITNESSES
R. A. Balderson
H. M. Corwin

INVENTOR
A. J. Bazeley
by Bakewell, Byrnes & Parmelee
his attys

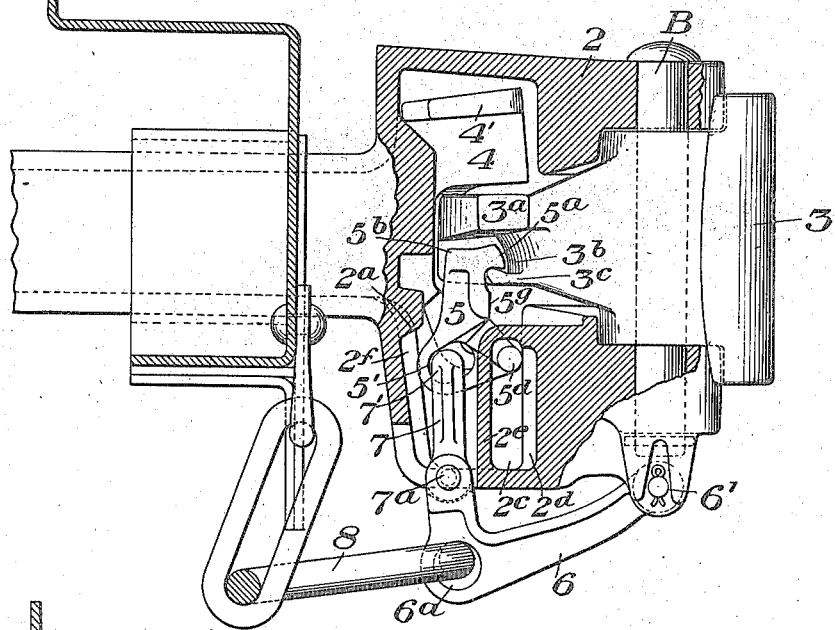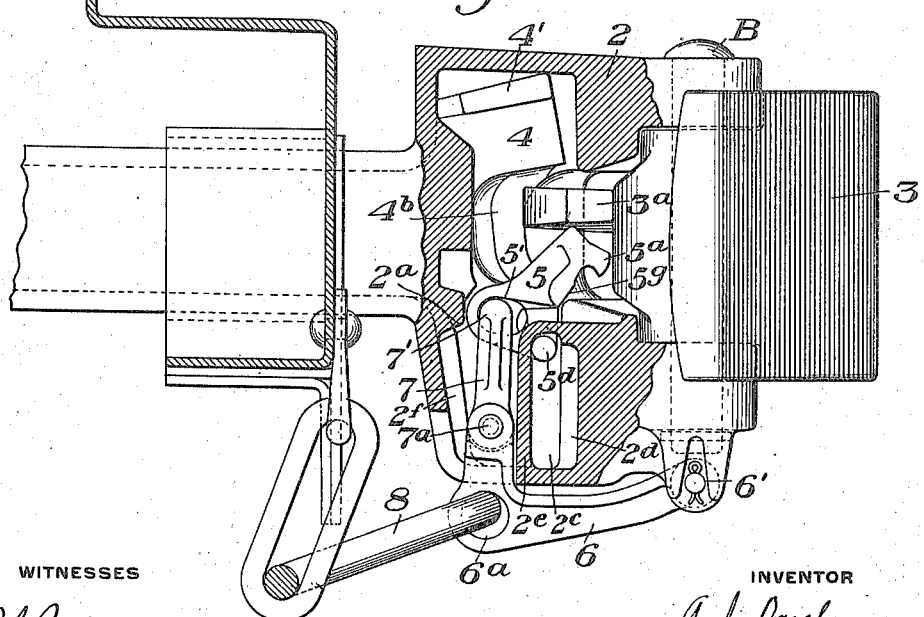

A. J. BAZELEY.
CAR COUPLING.
APPLICATION FILED DEC. 26, 1908.
947,748.
Patented Jan. 25, 1910.
4 SHEETS—SHEET 3.
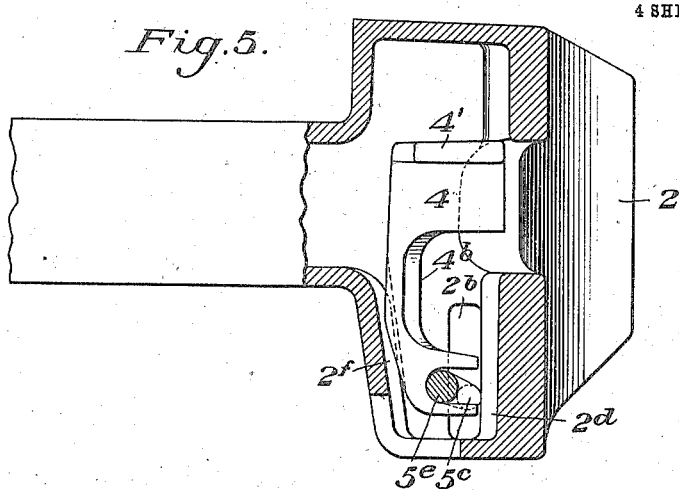
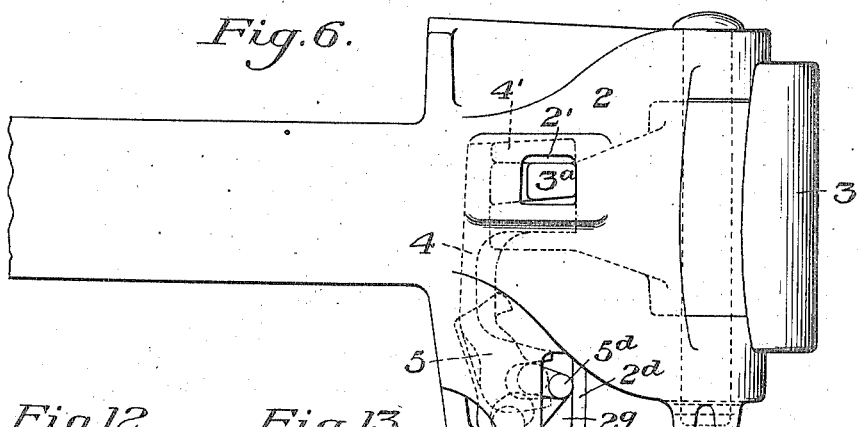
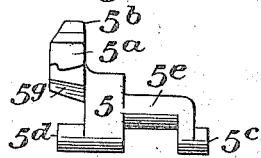
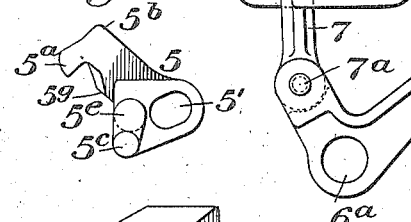
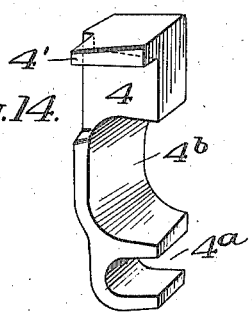
WITNESSES
INVENTOR

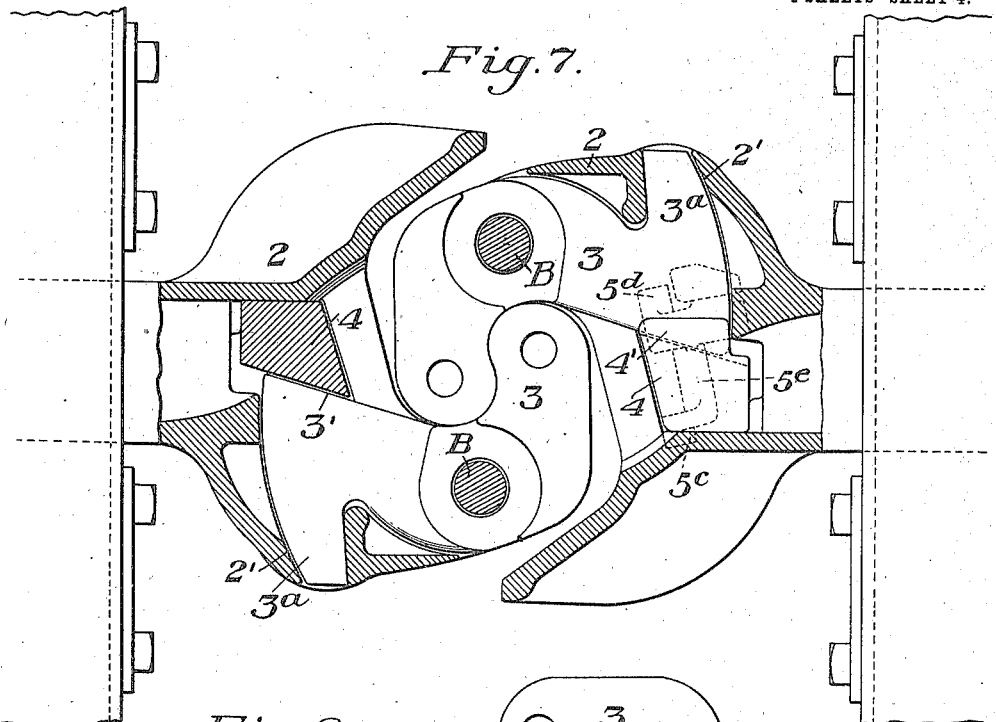
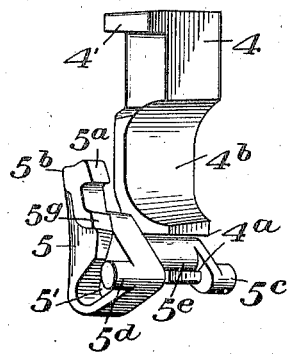
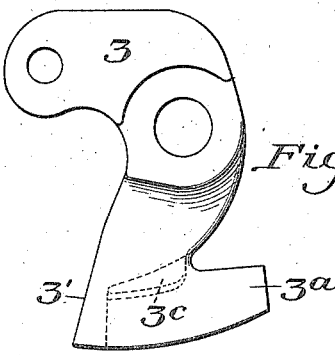
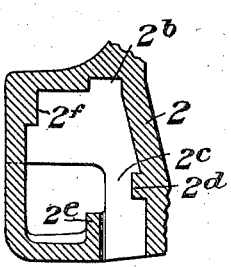
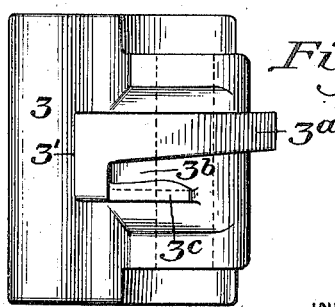

UNITED STATES PATENT OFFICE.

ARTHUR J. BAZELEY, OF CLEVELAND, OHIO, ASSIGNOR TO THE NATIONAL MALLEABLE CASTINGS COMPANY, OF CLEVELAND, OHIO, A CORPORATION OF OHIO.

CAR-COUPLING.

947,748.          Specification of Letters Patent.     Patented Jan. 25, 1910.

Application filed December 26, 1908. Serial No. 469,448.

*To all whom it may concern:*

Be it known that I, ARTHUR J. BAZELEY, of Cleveland, Cuyahoga county, Ohio, have invented a new and useful Car-Coupler, of which the following is a full, clear, and exact description, reference being had to the accompanying drawings, forming part of this specification, in which—

Figure 1:
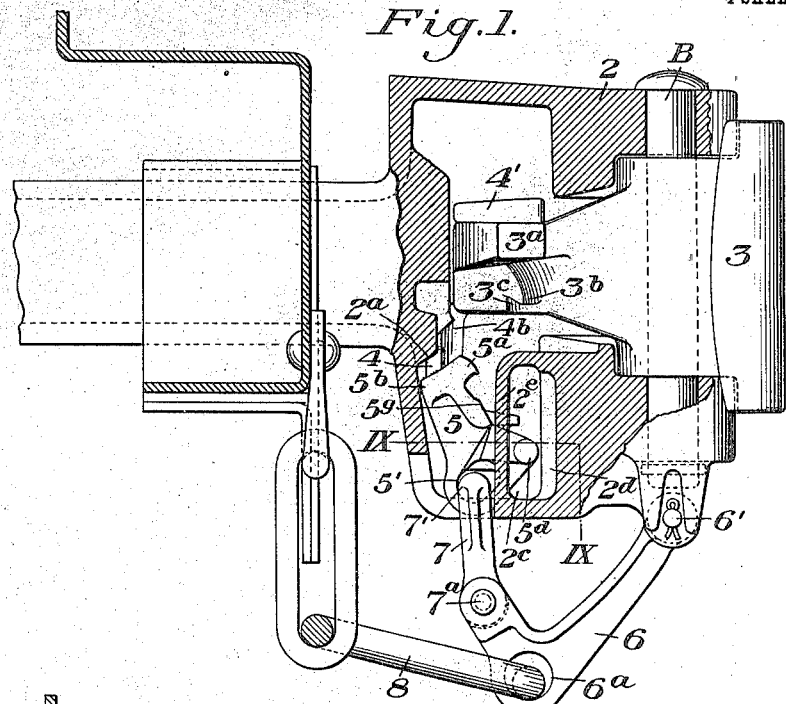
Figure 2:
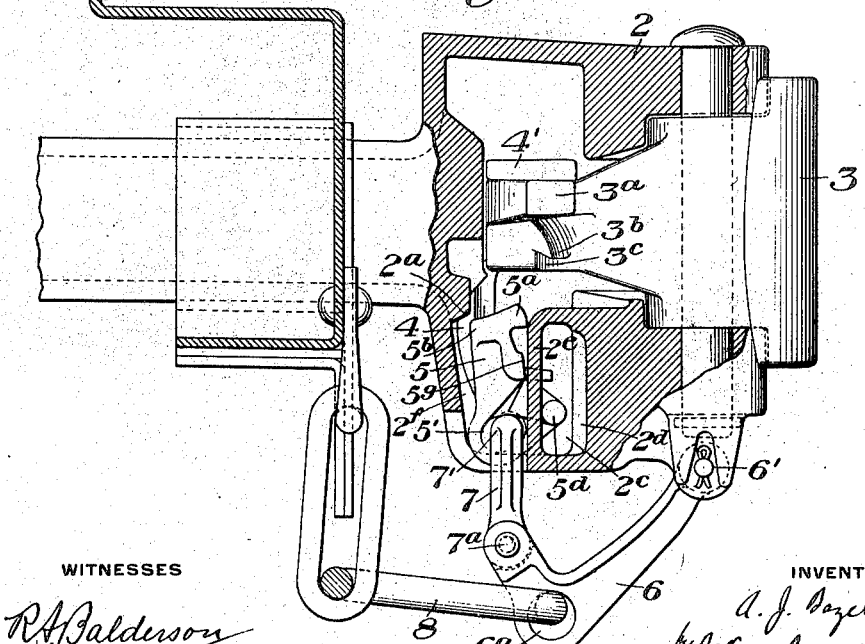

Figure 1 is a side elevation, partly in section, showing the parts of my coupler in locked position; Fig. 2 is a similar view showing the parts at the end of the first movement performed in unlocking the coupler; Figs. 3 and 4 are similar views showing the parts respectively in lockset position and when the knuckle is thrown completely open; Fig. 5 is a side elevation, partly in section showing the lock in full outline; Fig. 6 is a side elevation showing the working parts of the coupler in dotted lines; Fig. 7 is a plan view, partly in section, showing two of my couplers coupled together; Fig. 8 is a perspective view showing the fitting of the shuttle with the bottom of the lock; Fig. 9 is a horizontal section through the lower part of the coupler-head on the line IX—IX of Fig. 1, the operating parts of the coupler being omitted; Figs. 10 and 11 are detail views of the knuckle; Figs. 12 and 13 are detail views of the shuttle; Fig. 14 is a perspective view of the lock.

In the drawing 2 is the coupler head, 3 the knuckle, having a flat locking face 3' inclined to the longitudinal center line of the coupler and having a hook-shape tail $3^a$ which extends within a hole 2' in the side wall of the coupler-head, and by bearing upon the coupler-head relieves the pivot-pin B from strains and holds the knuckle in place in case of breaking of the pivot-pin. The knuckle has a locksetting ledge $3^c$ below the hooked portion $3^a$ of the tail and separated therefrom by a recess $3^b$.

The lock 4 has on the knuckle-side of its upper portion a ledge 4' which supports the lock on the knuckle when the knuckle is locked. The lock has at its base a hooked portion $4^a$ and at the middle a recess $4^b$ which, when the lock is raised to unlocked position, allows the knuckle to swing open.

5 is a shuttle, shown clearly in Fig. 8. It has three functions. It retains the lock in locked position; holds it in locked position; and is the member by which the knuckle is directly thrown open. At the upper portion of the shuttle is a hook-shaped projection 5 adapted to engage a seat upon the locksetting ledge $3^c$ of the knuckle, and a rear shoulder $5^b$ which when the parts are in locked position as shown in Fig. 1 moves by gravity under the shoulder $2^a$ of the coupler-head and prevents accidental upward creeping of the lock and shuttle during the jarring motion of the car. The shuttle has at its bottom portion trunnions $5^c$ and $5^d$. The trunnion $5^c$ slides within a groove $2^b$ (Figs. 5 and 9) in the coupler-head and the trunnion $5^d$ slides within a guide-way $2^c$ (Figs. 1 and 9) between ribs $2^d$ and $2^e$ on the coupler-head. The shuttle also has a middle trunnion $5^e$ out of line from the trunnions $5^c$ and $5^d$ which fits within a hooked portion $4^a$ at the bottom of the lock 4. The shuttle also has an elongated hole 5' at the rear of its bottom portion into which the hooked end 7' of a lifting link 7 fits thus positively articulating the lifting link with the shuttle. This link is pivoted at $7^a$ to a lever 6 which is pivotally attached at 6' to the bottom ear of the coupler-head and has an eye $6^a$ for the reception of the uncoupling rod 8.

When the parts are in locked position the lock is supported on the knuckle tail by the fitting of the ledge 4' on top of the lock as shown in Fig. 1, and the shuttle being then supported within the hooked portion $4^a$ of the lock by the trunnion $5^e$ which is forward of the center of gravity of the shuttle, the shuttle will drop backward by gravity, as shown in Fig. 1, so that its shoulder $5^b$ will rest beneath the shoulder $2^a$ on the coupler-head and will thus prevent upward creeping as above described.

When it is desired to unlock the coupler the uncoupling rod is raised, thus lifting the lever 6 and causing the hooked end 7' of the link 7 to move upwardly within the hole 5' of the shuttle and to turn the shuttle on the trunnion $5^e$ within the lock, causing the shoulder $5^b$ to move out from beneath the stop shoulder $2^a$ as shown in Fig. 2. This forward motion of the shuttle is limited in extent by the rib $2^e$ with which the forward surface of the shuttle $5^g$ engages, and this engagement continues until the projection $5^a$ at the top of the shuttle has passed behind and opposite to the knuckle tail. Then as the shuttle is raised far enough to clear the rib 2e, the projection 5a on the shuttle moves forwardly on to the ledge 3c of the knuckle tail and engages therewith thus holding the shuttle and thereby supporting the lock in lockset position, in which position the recess 4b is opposite the knuckle tail, thus leaving the knuckle-tail free to open when it is pulled by the motion of an adjoining car. The parts are thus brought into lockset position only when the coupler is engaged with the coupler of an adjacent car. If the coupler is disengaged from any other coupler and it is desired to throw the knuckle open, the lever 6 is lifted upward to its full extent by means of the uncoupling rod 8, whereupon the shuttle 5 will be caused to turn upon its trunnions 5c and 5d after these trunnions have engaged the top of the groove 2b and the curved top of the rib 2e respectively. The upper portion of the shuttle 5a then will engage the rear of the knuckle tail and will force the knuckle open. This action is shown in Fig. 4. Fig. 5 shows the groove 2b with the trunnion 5c sliding within it and the trunnion 5e in section within the hooked portion 4a of the lock.

It will be noticed, among other points of novelty and advantages of my device, that the trunnion 5e of the shuttle 5 is not in line with the trunnions 5c and 5d which engage the coupler head, but the trunnion 5e is so placed relatively to the position of the hook 7' of the link 7 within the hole 5' that during the initial lifting of the lock prior to the locksetting position this trunnion is almost directly above the position of the hook. There is, therefore, very little tendency of the lifting link to tip the shuttle until the trunnions 5c and 5d have engaged the top of the slot 2b and the top of the rib 2e on the coupler-head, so that friction between the shuttle and the wall of the coupler-head is avoided and the parts are rendered easy to move.

Another feature of novelty of the device resides in the formation of the shuttle with a hole 5' for engagement with the end of the lifting link 7. The presence of this hole enables the lifting link to be connected with the shuttle by a mere hook 7', and the flexible connection of these parts renders it unnecessary to take special pains to hold the other end of the uncoupling link of this lifting lever in precise position.

When the rod 8 is released after the knuckle has been thrown open or pulled open from lockset position, the shuttle 5 will drop back by gravity out of the path of the knuckle tail so that when the knuckle tail next closes it may not strike the shuttle.

The head of the lock 4 above the recess 4b rests upon the top of the knuckle tail while the knuckle is open, and as soon as the knuckle tail is closed the lock will drop by gravity into locking position and the shuttle will resume its lock-retaining position beneath the shoulder 2a as shown in Fig. 1.

During the vertical motion of the lock its rear portion is guided by the rib 2f at the rear of the coupler-head and is thus prevented from moving back far enough to disengage its hooked portion from the shuttle.

The trunnion 5d of the shuttle is accessible from the outside of the coupler-head through the lateral slot 2g (Fig. 6). This enables the lock to be tripped from lockset position without opening the knuckle, by an upward push from a man's finger or the end of a rod inserted through the slot 2g below the trunnion 5d. This will lift the projection 5a from its seat on the ledge 3c of the knuckle and the shuttle being free to swing backward by gravity the lock will then drop into the locking position shown in Fig. 1.

In my former patent, No. 833,434, the tripping of the device was effected by enlarging the hole in the side of the coupler-head through which the end of the knuckle tail projected, so that a rod could be inserted through this hole. This, however, was not so desirable as the present construction, for it was more difficult to release the parts and the enlargement of the hole was somewhat undesirable in point of view of strength. In the present construction the slot 2g being at the bottom portion of the coupler-head below the trunnion of the shuttle when in lockset position does not weaken the coupler substantially, and it makes the tripping easy.

The advantages of my invention will be appreciated by those skilled in the art. It strengthens the construction of the coupler, makes it more efficient in action, and is otherwise very desirable.

I claim as my invention:

1. A coupler having a swinging knuckle, a vertically moving lock, a shuttle connected with the lock having a rearward tilting motion to engage the coupler-head and having a forward motion for locksetting and opening the knuckle and having a projecting portion which successively in its forward motion engages a locksetting portion on the knuckle and then pushes the knuckle open, and a lifting link positively articulated with the shuttle.

2. A coupler having a knuckle, a lock, a shuttle pivotally connected with the lock and adapted to throw the knuckle open, a lifting link for the shuttle, the connection of said lifting link to the shuttle and the pivotal connection of the shuttle and lock being so related that the one is substantially above the other when the parts are lifted, and means whereby the continued lifting of the shuttle will cause it to tip.

3. A coupler having a lock, a shuttle connected with the lock having a trunnion 5e for engagement with the lock and other trunnions 5ᶜ and 5ᵈ for engaging the coupler-head a lifting device and a connection between the shuttle and the lifting device, said trunnion 5ᵉ being out of line from the other trunnions.

4. A coupler having a lock, a shuttle having a trunnion 5ᵉ for engagement with the lock and other trunnions 5ᶜ and 5ᵈ for engaging the coupler-head, a lifting device and a connection between the shuttle and lifting device, said trunnion 5ᵉ being out of line from the other trunnions and substantially above the connection with the lifting device during the initial lifting motion of the trunnion.

5. A coupler shuttle adapted to be pivotally connected to a lock and having a hole in its bottom portion shaped to retain a lifting link.

6. A coupler shuttle adapted to be pivotally connected to a lock and having a hole in its bottom portion, and a lifting link having a hooked end engaging with the edge of the hole and retained thereby.

7. A coupler having a lifting lock, a shuttle connected therewith adapted to lockset the lock and to move the knuckle open, and an opening in the coupler-head below the trunnion of the shuttle when in lockset position to permit access for tripping the parts from lockset position.

In testimony whereof, I have hereunto set my hand.

ARTHUR J. BAZELEY.

Witnesses:
HARRY E. ORR,
A. H. LEWIS.